United States Patent [19]

Toelke

[11] Patent Number: 4,733,888
[45] Date of Patent: Mar. 29, 1988

[54] PROTECTOR FOR THREADED CONNECTIONS

[76] Inventor: Lester W. Toelke, 204 Lisa La., Bellville, Tex. 77418

[21] Appl. No.: 939,955

[22] Filed: Dec. 10, 1986

[51] Int. Cl.$^4$ .............................................. F16L 57/00
[52] U.S. Cl. ...................................... 285/4; 285/45;
  285/93; 285/355; 285/901; 138/89; 138/96 T
[58] Field of Search ................... 285/45, 4, 901, 355,
  285/46, 93; 138/96 T, 89; 174/188; 220/276

[56] References Cited

U.S. PATENT DOCUMENTS

| | | | |
|---|---|---|---|
| 1,168,196 | 1/1916 | Hall | 285/355 |
| 1,646,736 | 10/1927 | Mills | 285/45 X |
| 1,692,710 | 11/1928 | Spahn | 138/96 T X |
| 2,101,514 | 12/1937 | Schmaus | 285/46 |
| 2,121,436 | 6/1938 | Lytle | 138/96 T |
| 2,784,865 | 3/1957 | Rieke | 285/4 X |
| 3,869,393 | 3/1975 | Booker | 285/355 X |
| 4,033,380 | 7/1977 | Weber | 138/96 T |
| 4,399,092 | 8/1983 | Snow, Sr. et al. | 138/96 T X |

Primary Examiner—Thomas F. Callaghan
Attorney, Agent, or Firm—Gunn, Lee & Jackson

[57] ABSTRACT

An improved pipe coupling protector including a thread protector with sleeve is disclosed. Moreover, a method of installation is also set forth. When manufactured, the sleeve is sized to fit over the threads on the exterior of a pipe end and has a surrounding end shoulder with a transverse cap. An undercut defines the cap for removal by puncturing action to enable the sleeve to move up the threads. At the time of installation, the pipe is threaded to a coupling. A lubricant or sealant is applied to the threads. The coupling and the sleeve of the present disclosure completely cover over the threads and they are sealed against atmospheric intrusion and capillary fluid flow along threads and at the coupling face by the sleeve with an underlying layer of sealant or lubricant.

15 Claims, 2 Drawing Figures

PROTECTOR FOR THREADED CONNECTIONS

BACKGROUND OF THE DISCLOSURE

This disclosure is directed to a device to protect male pipe threads during shipment or handling; the thread protector is installed on the exposed threads of pipe in an assembled pipe system to protect from corrosion above ground, under ground or under water. As an example, the thread protector is particularly advantageous for use with small diameter pipe, but not limited to ⅛" to about 6" having tapered threads known as dry seal threads. This pipe is most often galvanized at the mill and shipped in 20 foot lengths to a distributor or end user for cutting to length. Threads will be added to conform to system requirements. When a thread is machined on the pipe, the protective coating (e.g., galvanizing) is removed thus exposing unprotected metal. Cutting and threading removes the protective coating and thereafter leaves an unprotected male thread.

Pipe thread protectors installed at the pipe mill may include shipping wrappers such as paper or tape covers. Also, disposable end caps are known. In very general terms, the variety is unlimited but protection of the pipe (both before and after installation) is irregular, and especially so around the male threads on the pipe. It is fairly common to use metal pipe which has been coated with a thin film (usually galvanizing) to prevent corrosion. In actuality, it does not really prevent corrosion, rather, it merely delays the onset of corrosion. Where the coating is absent, the corrosion starts even more rapidly. The rate of pipe thread corrosion is dependent on environmental conditions. The measure of corrosive severity increased markedly in humid areas, areas near water and especially areas near the sea coast. For instance, a breeze from a salt water body will cause significantly accelerated corrosion of pipe. It is also true at locations which are exposed to widely fluctuating temperature extremes. These and other variables cause wide variation in threaded pipe longevity. As one example, consider a typical one-family residence which has a conventional threaded pipe connection from the gas main to the gas meter. The exposure variations and risk of damage can be quite severe for the gas meter connections. The gas meter is typically installed out of doors and is exposed to inclement weather. Highly corrosive fertilizers, insecticides, etc. accelerate corrosion. Adding the variables mentioned above, exposed connections may corrode and require replacement in quick order when it is intended to least many years. While the failure date is difficult to predict, but in any event, the threaded connections on the meter must be inspected often and corrosion must be dealt with in all circumstances to improve safety and reduce loss of unmetered gas. Failure of the threaded pipe connections is an expensive repair or replacement job; if the threaded connection life can be extended, then safety is increased and cost is reduced.

Several devices have been used in the past. For instance, Teflon tape (a registered trademark of the DuPont Company) is often applied to the threads, also, shrink sleeves aer known. Various weights of grease, adhesives, sealants or bituminous coatings can also be applied to the threads. They provide some measure of protection. In some instances, the previous devices are detrimental in that they trap fluid condensate or otherwise allow capillary migration of fluid directly to the threaded area. Such flow may be miniscule but it will nevertheless contribute to the damage of threads, perhaps in a fashion unseenby visual inspection. One prior art device is an added threaded sleeve such as that shown in the patent of Schmaus, U.S. Pat. No. 2,101,514. This patent is representative of other pipe thread protectors including U.S. Pat. No. 1,168,196. Primarily, the Schmaus structure suffers from limitations arising out of a dissimilar metal junction which gives rise to currents between the metals which may cause corrosion in the presence of an electrolyte. Moreover, Schmaus does not deal with full thread protection. The last thread on the threaded male pipe is viewed as most subject to failure in a threaded pipe system. With normal installation, mechanical loading acts on the region of the last thread, the most vulnerable part of the pipe. Even though the pipe is galvanized, this will not retard corrosion in exposed last thread region. Again, corrosion may be accelerated depending on the nature of environmental conditions. For all these reasons, the improved device of this disclosure provides protection and is therefore markedly more desirable than the devices of the prior art.

This new, useful and unobvious apparatus is a thread protector which functions as a sleeve or cap which fits over the threads at the time of manufacture. When the pipe is threaded, this device can be installed over the threads. The device length covers the threads in most instances. It has a transverse head or covering which forms a sacrificial disc which is easily punched out of the device covering the open end of the pipe prevents foreign matter entering into the pipe. At the time the threaded pipe is installed, the disc can be cleared to leave a sleeve with a surrounding radial shoulder to provide a structurally substantial member for abutting pipe couplings threaded on the pipe. So to speak, the sleeve is forced up the pipe by the coupling to position the sleeve portion sufficiently along the pipe so that all the threads beyond the coupling are protected. The device abuts against the coupling (female fitting) to cover the threads not within the coupling. A dissimilar metal junction between the protective device and pipe or coupling is avoided because the preferred material of this apparatus is a polymer as will be described below. Moreover, sealing against the atmosphere can be easily achieved by packing with a grease, silicon or other sealant. Capillary liquid flow is prevented around the threaded area and coupling face. The present apparatus thus converts readily from a capped thread protector into a sleeve which covers all the exposed threads and thereby prevents corrosion at the exposed threads.

BRIEF SUMMARY OF THE DISCLOSED APPARATUS

This apparatus is a plastic cap which initially serves as a thread protector for pipe. At the time of pipe installation, the present invention is left on the pipe with a sleeve portion of sufficient length telescoping over the exposed male threads of a threaded pipe. Initially, the protector covers the pipe end to function as a cap. The protective cap is placed over the end of the pipe indefinitely until such time as the pipe is installed in a plumbing system. At that time, the end of the cap can be punched out. This defines an upstanding, exposed shoulder on the exterior. The shoulder is abutted against a coupling to position the sleeve portion over the threads exposed to atmosphere beyond the coupling. This permits the device to be converted to a corrosion protective device at the time the pipe is threaded to a coupling. In conjunction with grease, silicon or other sealants, a corrosion-proof fitting is then installed, and al the threads and coupling face is covered to thereby assure protection against corrosion arising from inclement weather and chemicals in the atmosphere.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
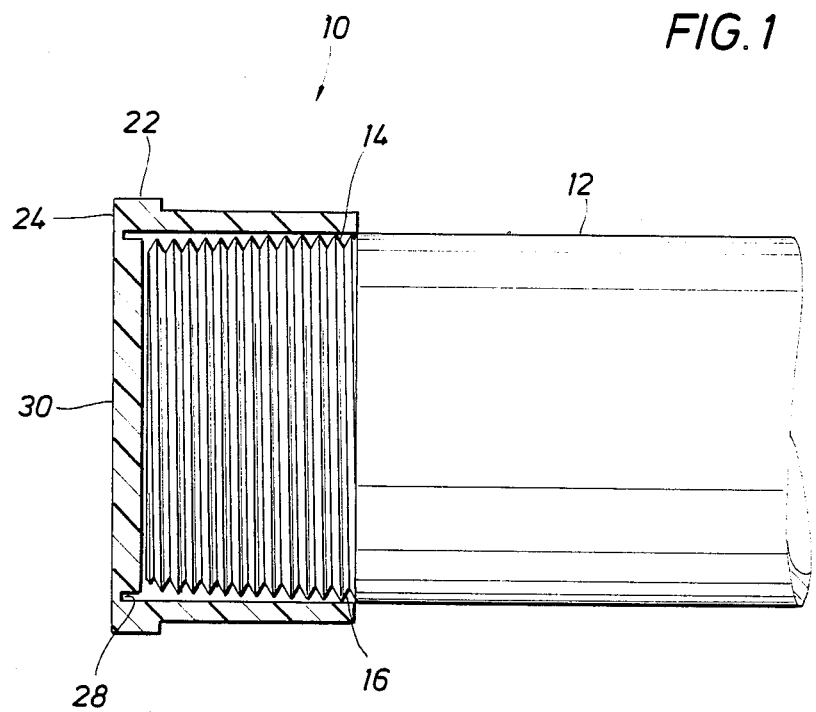
FIG. 1 shows the thread protector cap of the present disclosure positioned over a set of threads on a pipe, and further illustrates a central portion which is defined by a circular internal groove so that the cap can be punched out, thereby defining a sleeve which covers the threads.

Attention is first directed to FIG. 1 of the drawings where the improved thread protector of the present disclosure is identified by the numeral 10. It is placed on a pipe 12 is threaded with male threads at 14. The pipe may be wholly coated, wholly bare or both. The threads terminate at a last thread 16. This is sometimes known as the "last scratch" referring to the fact that it is an area or region of weakness in the pipe and is particularly susceptible to wear, corrosion or mechanical stress. The last scratch region at 16 may or may not be protected when manufactured. It may be exposed bare metal; it may be a regular or tapered thread, it is, generally, a region of weakness. Depending on the conditions and passage of time, this region will likely be the weakest region of the plumbing system when the pipe 12 is assembled in a piping system.

Typically, the pipe 12 will be in the range of about ⅛" to about six inches in nominal diameter. These are the National Standard pipe sizes which are typically installed in single-family residences, apartment complexes, office buildings, industry and similar locations. It is particularly intended that the present apparatus be used with threaded pipe which may be cut and threaded at the plant after manufacture or threaded prior to installation. The pipe 12 is thus described as a mass manufactured pipe where the threads and exterior may or may not be protected with a coating.

The thread protector of this disclosure incorporates a sleeve portion 20. The sleeve portion 20 defines a right cylinder construction. It has sufficient length to cover the threads and a portion of the unthreaded pipe body, and has an internal surface that fits snug over the threads and pipe body. It is not essential that the threads "take a bite" or cut into the inner wall of the sleeve 20.

The sleeve terminates at an upstanding circular shoulder or lip 22. This fully encircles the sleeve portion 20. The shoulder 22 defines an abutting face at 24. The face 24 can be in a commom plane transverse to the center line of the pipe 12 and the thread protector 10. It can also be somewhat sloping or constructed with a small to medium size semicircular bead. It is helpful that the face 24 on the shoulder have a region of contact for cooperation with the pipe coupling as will be described in FIG. 2.

Around the interior of the sleeve 20, a recessed groove 28 is formed adjacent to the sleeve so that a very thin web or membrane is defined. The groove depth and webbing remaining can vary even to the point of forming spaced perforations in a circle. There is a central cap 30 in the form of a circular disc. At the time of manufacture, it is integral with the remainder of the structure which is ideally made by injection molding techniques. However, the cap 30 can be removed by punching out the cap 30. This breaks the cap free at the groove 28. The groove 28 is thus sufficiently deep that it leaves a thin web ranging from about 0.001 to about 0.015 inches thickness. This range can differ depending on the nature of the material used to form the thread protector 10. It is important however to note that the central cap can be removed simply by striking or punching with a mallet, hammer or other blunt instrument at the cap portion 30. This procedure can be used to break the cap free at the groove 28. When this is done, it leaves the sleeve open to telescope further along the pipe 12.

The device of the present disclosure is installed by finger pressure. It is positioned on the end of the pipe until the cap 30 abuts against the end of the pipe. At this time, it will cover most of the threads 14. Moreover, it is held on by friction in view of the relatively close manufacturing tolerance. To the measure that pipe is not perfectly round, the device of this disclosure is deformable. The preferred deformable material enables the sleeve to accommodate less than a perfect circle. An exemplary material is a low density polyethylene but alternate materials can be used. Pliability is desirable so the sleeve can flex and stretch; there is a hoop load where an interferance fit is encountered. The thickness of the wall of the sleeve 20 typically can vary up to about 0.031 or 0.312 inches depending on scale factors and the choice of material. As mentioned before, the face 24 can be planar, tapered, or constructed with a bead to improve contact and sealing.

Figure 2:
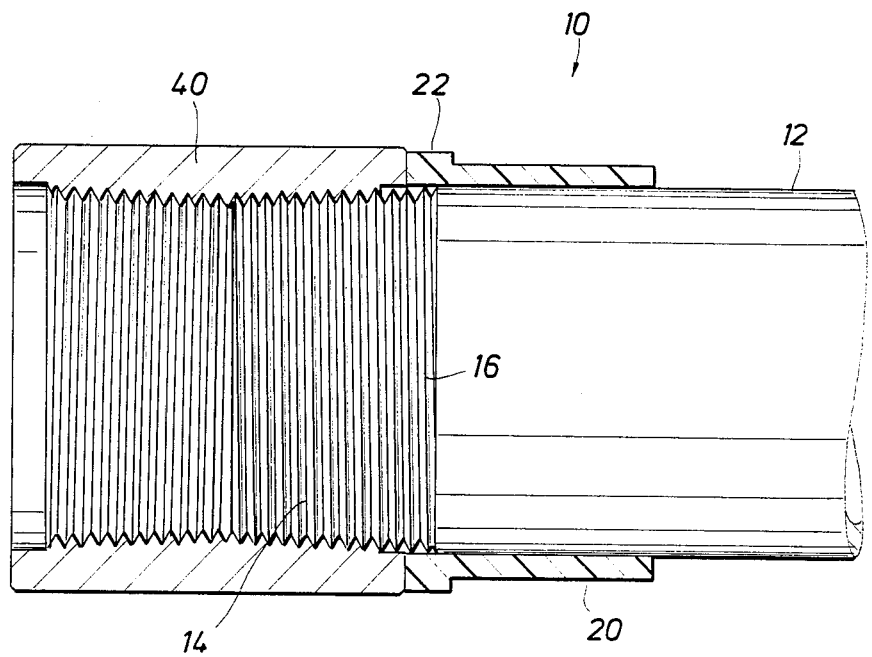
FIG. 2 shows the thread protector of FIG. 1 after the central cap has been removed wherein a coupling has pushed the thread protector on the pipe to assure protection of all portions of the threads, both those covered by the coupling, and those which are exposed on the exterior of the pipe.

Attention is now directed to FIG. 2 of the drawings where the pipe 12 and coupling face is fully protected after installation of a pipe coupling 40. The term coupling refers also to a tee, elbow or any other threaded device which engages the male threads on the pipe 12. At this stage, the pipe 12 has been threaded to a coupling 40 for assembly in a plumbing system. The coupling has an abutting end face which contacts the face 24 adjacent to the surrounding shoulder 22. Moreover, the coupling threads up over most but not all of the threads 14. It is not uncommon to leave two or three of the threads exposed. The present invention 10 is pushed onto the pipe. It slides along the pipe in telescoping fashion. It abuts the end of the pipe coupling 40 and extends over the threads to protect the threads against corrosion. Moreover, at the time of installation, a grease, lubricant or other sealant is placed on the threads and pipe surface. When the coupling is threaded to the pipe, it pushes some of the grease or lubricant along the threads. It is convenient to smear an excess quantity of sealant or lubricant on the threads prior to coupling engagement, leaving some under the sleeve 20 even after the sleeve 20 is moved further along the pipe. This leaves a coating of sealant or lubricant under the sleeve 20 and especially in the region of the threads. This typically will cover all the threads with the sealant. Moreover, the sleeve extends over the threads. The annular space between the sleeve 20 and the pipe 12 is thus sealed with the sealant or lubricant, and prevent capillary fluid flow between the protector and the threads. If desired, sufficient sealant can be placed underneath the sleeve 20 and in the region of the coupling that the end face of the shoulder 22 is also covered. It is very helpful to provide complete sealing against the external atmosphere so that the region of the threads and especially the last scratch thread 16 is protected. In general terms, a sealing material under the sleeve enhances performance, particularly by excluding atmospheric exposure and also preventing water flow. Water, normally mixed with various materials, can flow due to capillary movement into and along the threads, increasing rust, corrosion and erosion.

The arrangement of FIG. 2 is achieved in relatively quick order. While the pipe 12 may be stored for weeks or months, and such storage is assisted by placing the thread protector 10 over the end of the pipe (see FIG. 1), the thread protector 10 is quickly converted to the form shown in FIG. 1. Conveniently, it is removed from the end of the pipe, and the cap 30 is punched out quickly. Then, the device is moved beyond the threads. Also, the pipe threads are painted or smeared with the sealant or lubricant. As always, the coupling 40 is joined to the threads 14 in the conventional manner. As it threads up to the final torque, the shoulder of the coupling pushes the present apparatus further along the pipe. It is desirable to leave the sleeve 20 in the location shown in FIG. 2. Typically, the present apparatus does not interfere with installation of the pipe and threaded coupling in the pipe system.

When the threaded connection is complete between the pipe 12 and the coupling 40, the thread protector 10 of the present disclosure is in the position illustrated. All the threads are enclosed and the coupling face is protected. Thus the connection is protected from exposure to detrimental environment by the overcovering thread protector 10 of this disclosure. It assures a high measure of protection. It is far better than merely using protective tape in the pipe joint.

The present apparatus is a device which can be installed and left permanently at a threaded joint in a pipe system. This permits the device to protect the threaded joint indefinitely, far greater than would be obtained with an exposed connection or with other protective devices. Moreover, this protective device 10 is relatively inexpensive in cost and can be manufactured in great quantity to enable an inexpensive corrosion protection system for a completed plumbing system whether indoors or outdoors, whether above ground or below ground. An added benefit is color coding (cosmetically attractive) the sleeve to indicate a particular fluid in the pipe, e.g., black for water, red for gas, etc.

While the foregoing is directed to the preferred embodiment, the scope thereof is determined by the claims which follow:

What is claimed is:

1. Apparatus for protecting a pipe, the apparatus comprising a thread protector having an elongate sleeve of deformable non-metallic plastic material sized to fit about the exterior and over all of the threads of a male threaded pipe end, said sleeve terminating at an end located circumferential shoulder thereabout, a peripheral face on said shoulder for abutting a pipe coupling threadedly engaged with the male threads on the end of the pipe, and wherein said sleeve is of sufficient length so that said sleeve extends beyond the pipe threads on the pipe when the pipe is threaded to a pipe coupling and wherein said sleeve, relative to the pipe threads, has an interference fit therewith, and also including an encircling end located sealant receiving space beneath said sleeve and adjacent to said circumferential shoulder such that said apparatus protects the male pipe threads before and after installation.

2. The apparatus of claim 1 wherein said shoulder is immediately adjacent to an end cap which closes over the end of the sleeve, said end cap being joined to said shoulder at an encircling undercut region of relatively thinner material to enable said end cap to be removed at the time a coupling is installed on the pipe.

3. The apparatus of claim 2 wherein said cap is encircled by an undercut, and the undercut is of controlled thickness to enable easy removal of said cap.

4. The apparatus of claim 3 wherein said cap, on removal, leaves an opening of sufficient diameter to enable said sleeve to slide further along the pipe and over the threads thereof.

5. The apparatus of claim 4 said undercut defines a cap thickness enabling breaking of the cap at said undercut.

6. The apparatus of claim 4 wherein said cap terminates at an exposed shoulder face, said face abutting the pipe coupling and wherein said shoulder face is adjacent to and concentric around said undercut.

7. The apparatus of claim 1 wherein:
   (a) is made of a deformable plastic up to about 0.312 inches thick;
   (b) has a length to cover pipe threads after abutting the coupling; and
   (c) said shoulder at the end thereof forming a seal surface at the coupling end face.

8. The apparatus of claim 1 wherein:
   (a) said sleeve has a length such that said sleeve fits over the male threads on the end of said pipe and covers over the male threads to extend along a portion of the pipe; and
   (b) said shoulder at the end thereof forming a seal surface at the coupling end face.

9. The apparatus of claim 8 wherein said face on said shoulder is in a common plane to define a contact face with the pipe coupling.

10. A method of protecting a pipe having male threads on the end thereof comprising the steps of:
    (a) forming a sleeve out of a non-metallic pliable polymer to avoid dissimilar metal contact against the pipe by the sleeve;
    (b) positioning a sleeve over the end of the pipe, said sleeve having a sufficient length to cover a selected length of pipe and all the threads thereon and wherein the sleeve terminates at an end cap, the end cap closing over the end of the pipe;
    (c) subsequently removing the end cap to expose an opening in the sleeve of sufficient diameter to enable the sleeve to slide along the pipe and to permit the pipe to extend through the opening;

(d) threading the pipe to a coupling having an end located shoulder outside of the threads on the pipe wherein the shoulder abuts against the sleeve; and (e) upon completing the threaded connection between the pipe and coupling, positioning the sleeve against the end of the coupling so that the sleeve and coupling together cover over all the threads on the exterior of the pipe.

11. The method of claim 10 further including the step of applying to the exterior of the pipe before threading to the coupling a lubricant or sealant thereon and thereafter moving the sleeve so that sealant is located between the sleeve and the pipe to cover the threads to form an intermediate seal preventing capillary fluid flow along the pipe threads about the threads not under the coupling after the coupling has been joined to the pipe.

12. The method of claim 11 further including the step of forming a shoulder around said sleeve and having an end located face, the end located face being contacted against the coupling when threaded to the pipe, and including the step of abutting the pipe coupling against the end face to form a circumferential seal around the pipe between said shoulder and said coupling.

13. The method of claim 12 including the step of sizing the sleeve to grip the pipe and threads snugly and forming the end cap across the sleeve with an internally located undercut to enable removal of the end cap at the undercut.

14. The method of claim 13 wherein the undercut is defined by a thin wall for easy end cap removal, and further including the step of end cap removal by breaking the end cap at the undercut.

15. The method of claim 14 including the step of color coding the sleeve to indicate fluid type in the pipe.

* * * * *